United States Patent
Ogawa et al.

(10) Patent No.: US 7,580,248 B2
(45) Date of Patent: Aug. 25, 2009

(54) LIQUID CRYSTAL TELEVISION AND LIQUID CRYSTAL DISPLAY APPARATUS

(75) Inventors: Masuo Ogawa, Osaka (JP); Hiroki Ishii, Osaka (JP)

(73) Assignee: Funai Electric Co., Ltd., Daito-shi, Osaka (JP)

( * ) Notice: Subject to any disclaimer, the term of this patent is extended or adjusted under 35 U.S.C. 154(b) by 780 days.

(21) Appl. No.: 11/300,605

(22) Filed: Dec. 14, 2005

(65) Prior Publication Data

US 2006/0221261 A1 Oct. 5, 2006

(30) Foreign Application Priority Data

Dec. 14, 2004 (JP) .................... 2004-007339 U

(51) Int. Cl.
*G06F 1/16* (2006.01)
(52) U.S. Cl. .............. 361/679.21; 361/679.22; 248/917; 248/921; 348/794
(58) Field of Classification Search ............. 361/679.22
See application file for complete search history.

(56) References Cited

U.S. PATENT DOCUMENTS

| | | | | |
|---|---|---|---|---|
| 6,256,075 | B1* | 7/2001 | Yang | 348/843 |
| 6,651,943 | B2* | 11/2003 | Cho et al. | 248/122.1 |
| 6,899,311 | B1* | 5/2005 | Ternus | 248/454 |
| 7,021,600 | B2* | 4/2006 | Yang | 248/688 |
| 7,299,580 | B2* | 11/2007 | Wang et al. | 40/719 |
| 2004/0232298 | A1* | 11/2004 | Bremmon et al. | 248/281.11 |
| 2005/0092890 | A1* | 5/2005 | Liao | 248/466 |
| 2005/0253040 | A1* | 11/2005 | Yang | 248/688 |
| 2006/0016941 | A1* | 1/2006 | Choi et al. | 248/122.1 |
| 2006/0049327 | A1* | 3/2006 | Chen | 248/371 |
| 2006/0050471 | A1* | 3/2006 | Chen | 361/681 |
| 2006/0113382 | A1* | 6/2006 | Singgih et al. | 235/383 |
| 2006/0168865 | A1* | 8/2006 | Watanabe | 40/745 |

FOREIGN PATENT DOCUMENTS

| | | |
|---|---|---|
| JP | 08-172279 | 7/1996 |
| JP | 08-264965 | 10/1996 |
| JP | 3096746 | 7/2003 |

OTHER PUBLICATIONS

Patent Abstracts of Japan, Application No. 08-172279, dated Jul. 2, 1996 (2 pages).
Patent Abstracts of Japan, Application No. 08-264965, dated Oct. 11, 1996 (2 pages).

* cited by examiner

*Primary Examiner*—Jayprakash N Gandhi
*Assistant Examiner*—Anthony Q Edwards
(74) *Attorney, Agent, or Firm*—Osha • Liang LLP

(57) ABSTRACT

A liquid crystal display apparatus includes: a cabinet constituting an apparatus main body; a stand member including: a base member attached to be contained in a recess portion of a back face of the cabinet; and a pivoting member attached to the base member; an engaging portion provided at the back face and engaged with a side of a wall in hanging on the wall; and a heat radiating hole provided at the back face, wherein: the stand member supports the apparatus main body by bringing the pivoting member into an opened state, and contains the pivoting member in the back face in mounting on the wall; the pivoting member is brought into contact with the wall at a front end side of the pivoting member to form a predetermined gap between the wall and the back face in hanging on the wall.

5 Claims, 9 Drawing Sheets

LIQUID CRYSTAL TELEVISION AND LIQUID CRYSTAL DISPLAY APPARATUS

BACKGROUND OF THE INVENTION

1. Field of the Invention

The invention relates to a liquid crystal television and a liquid crystal display apparatus, particularly relates to a liquid crystal television and a liquid crystal display apparatus including a heat radiating hole and a stand member provided on a back face of a cabinet.

2. Description of the Related Art

In a background art, as an example of a liquid crystal display apparatus, a liquid crystal television is known. FIG. 12 is a rear view showing a total constitution of a liquid crystal television according to an example of a background art. FIG. 13 is a side view in mounting the liquid crystal television according to the example of the background art shown in FIG. 12. FIG. 14 through FIG. 16 are views showing details of a structure of the liquid crystal television according to the example of the background art shown in FIG. 12. First, a structure of a liquid crystal television 110 according to an example of a background art will be explained.

As shown by FIG. 12 and FIG. 13, the liquid crystal television 110 according to the example of the background art is provided with a resin frame 102 arranged to surround a side face and a back face of a liquid crystal display unit 101 (refer to FIG. 13). Further, a back face 102a of the resin frame 102 is provided with a heat radiating hole 102b and an engaging hole 102c. The radiating hole 102b is provided for radiating heat generated at the liquid crystal display unit 101 to outside. Further, the engaging hole 102c is constituted to engage the liquid crystal television 110 to an engaging hook 131a of an attaching plate 131 formed at a wall 130 (refer to FIG. 17).

Further, a back face 102a of the resin frame 102 is attached with a stand member 104 and the back face 102a of the resin frame 102 is provided with a containing portion 102d for containing the stand member 104. The stand member 104 is constituted by a base member 105 attached to the containing portion 102d of the back face 102a of the resin frame 102 and a pivoting member 106 pivotably attached to the base member 105. Further, as shown by FIG. 14 and FIG. 16, the base member 105 of the stand member 104 is provided with a pivoting shaft 105a, a pressing spring 105c, a positioning plate 105d, and four screw holes 105a (refer to FIG. 12). Further, the pivoting member 106 is pivoted centering on the pivoting shaft 105a of the base member 105. Further, the pressing portion 105b is arranged to be pressed by the pressing spring 105c to press a projected portion 106a of the pivoting member 106. Further, as shown by FIG. 12, the base member 105 of the stand member 104 is mounted to the back face 102a of the resin frame 102 by inserting and fastening four screws 107 into the screw holes 105e of the base member 105.

Further, as shown by FIG. 14 and FIG. 16, the pivoting member 106 of the stand member 104 is provided with the projected portion 106a made of a metal and a reinforcing rib 106b for reinforcing the pivoting member 106. Further, as shown by FIG. 12, the pivoting member 106 of the stand member 104 is provided with a grounding portion 106c formed by rubber.

FIG. 17 is a front view of the attaching plate used in hanging the liquid crystal television according to the example of the background art shown in FIG. 12 on a wall. FIG. 18 is a side view showing a state of attaching the liquid crystal television according to the example of the background art shown in FIG. 12 to the attaching plate of the wall. Next, a method of installing the liquid crystal television 110 according to the example of the background art will be explained in reference to FIG. 12 through FIG. 18.

First, as shown by FIG. 13, when the liquid crystal television 110 is mounted on a predetermined base 150, the pivoting member 106 of the stand member 104 supports the liquid crystal television 110 in an opened state of being pivoted by a predetermined angle amount relative to the back face 102a of the resin frame 102. Specifically, as shown by FIG. 14, the projected portion 106a of the pivoting member 106 is pressed to a pressing face 161b in mounting of the pressing portion 105b of the base member 105. Thereby, by bringing the projected portion 106a of the pivoting member 106 into contact with the positioning plate 105d of the base member 105, the pivoting member 106 is positioned to an inclined angle position in the opened state.

On the other hand, in hanging on the wall, as shown by FIG. 15, the pivoting member 106 of the stand member 104 is brought into a closed state of being closed to the base member 105, and contained in the containing portion 102d of the back face 102a of the resin frame 102. Specifically, as shown by FIG. 16, the projected portion 106a of the pivoting member 106 is pressed to a pressed face 162b in wall hanging of the pressing portion 105b of the base member 105. The pressed face 162b in wall hanging is inclined to a direction of pressing the base member 105, and a force F2 for generating a moment M2 for pivoting the pivoting member 106 to a side of the containing portion 102d is generated. In this way, in hanging on the wall, the pivoting member 106 is brought into the closed state and completely contained in the containing portion 102d. Further, in hanging on the wall, as shown by FIG. 17, the attaching plate 131 having the two engaging hooks 131a is mounted to the wall 130. Further, by engaging the two engaging holes 102c of the back face 102a of the resin frame 102 with the engaging hooks 131 (refer to FIG. 17) of the attaching plate 131, as shown by FIG. 18, the liquid crystal television 110 is attached to the side of the wall 130. At this occasion, in the background art, the back face 102a of the resin frame 102 is brought into contact with the wall 130 without a gap therebetween.

Meanwhile, various structures of stand members of display apparatus are known in background arts (refer to, for example, Japanese Utility Model Registration No. 3096746, JP-A-8-172279 and JP-A-8-264965).

Japanese Utility Model Registration No. 3096746 discloses a liquid crystal television capable of containing a stand member inclined in a plurality of inclining angles at a back face thereof.

Further, JP-A-8-172279 discloses a stand apparatus (structure of stand member) capable of containing leg members (stand members) to side walls on both sides of PDP (plasma display).

Further, JP-A-8-264965 discloses a leg member structure of a cabinet capable of containing a leg member (stand member) of a display apparatus formed by an elastic material to a containing portion provided at an inner portion of the cabinet.

SUMMARY OF THE INVENTION

According to the liquid crystal television 110 of the background art shown in FIG. 12 through FIG. 18, in hanging on the wall, the wall 130 (refer to FIG. 18) and the back face 102a of the resin frame 102 are brought into contact with each other without a gap therebetween and therefore, there is a drawback that the heat radiating hole 102b (refer to FIG. 12) provided at the back face 102a of the resin frame 102 is closed by the wall 130. Thereby, in hanging on the wall, heat cannot be radiated from the heat radiating hole 102*b* to outside and therefore, there poses a problem that an inner temperature of the liquid crystal television 110 rises.

Further, according to the liquid crystal television disclosed In Japanese Utility Model Registration No. 3096746, in hanging on the wall, the stand member is completely contained in the back face of the cabinet and therefore, similar to the case of the liquid crystal television of the background art shown in FIG. 12 through FIG. 18, it seems that the wall and the back face of the cabinet are brought into contact with each other without a gap therebetween. Further, when the heat radiating hole is provided at the back face of the cabinet, the heat radiating hole is closed by the wall and therefore, it seems that there poses a problem that the inner temperature of the liquid crystal television rises.

Further, according to the stand apparatus disclosed in JP-A-8-172279, in hanging on the wall, the stand members are completely contained in the side walls on the both sides of PDP (plasma display) and therefore, similar to the case of the liquid crystal television of the background art shown in FIG. 12 through FIG. 18, in hanging on the wall, it seems that the wall and the back face of PDP are brought into contact with each other without a gap therebetween. Further, when the heat radiating hole is provided at the back face of the cabinet, the heat radiating hole is closed by the wall and therefore, it seems that the problem that the inner temperature of PDP rises is posed.

Further, according to the leg member structure of the cabinet disclosed in JP-A-8-264965, in hanging on the wall, the stand member is completely contained in a containing portion provided at an inner portion of the cabinet and therefore, similar to the case of the liquid crystal television of the background art shown in FIG. 12 through FIG. 18, in hanging on the wall, it seems that the wall and the back face of the cabinet are brought into contact with each other without a gap therebetween. Further, when the heat radiating hole is provided at the back face of the cabinet, the heat radiating hole is closed by the wall and therefore, it seems that the problem that the inner temperature of the display apparatus rises is posed.

The invention has been carried out in order to resolve the above-described problem and it is an object of the invention to provide a liquid crystal television and a liquid crystal display apparatus capable of excellently radiating heat in hanging on a wall.

In order to achieve the above-described object, according to a first aspect of the invention, there is provided a liquid crystal television which is a liquid crystal television including a stand member including a base member attached to be contained in a recess portion of a back face of a cabinet constituting an apparatus main body and a pivoting member pivotably attached to the base member, supporting the apparatus main body by bringing the pivoting member into an opened state by being pivoted by a predetermined angle in mounting and capable of containing the pivoting member in the back face of the cabinet in hanging on a wall, an engaging portion provided at the back face of the cabinet for engaging with a side of the wall in hanging on the wall, and a heat radiating hole provided at the back face of the cabinet for radiating heat of the apparatus main body to outside, wherein the pivoting member of the stand member is brought into contact with the wall at a front end side of the pivoting member to form a predetermined gap between the wall and the back face of the cabinet by being inclined by a predetermined angle to a side of the wall in a closed state of being contained in the back face of the cabinet in hanging on the wall, and the base member of the stand member is integrally provided with a pair of left and right projected pieces for restricting the pivoting member to a position of being inclined by the predetermined angle to the side of the wall in hanging on the wall.

According to the liquid crystal television according to the first aspect of the invention, as described above, a heat radiating space can be formed between the back face of the cabinet of the liquid crystal television and the wall in hanging on the wall by bringing the front end side of the pivoting member into contact with the wall to form the predetermined gap between the wall and the back face of the cabinet by inclining the pivoting member of the stand member by the predetermined angle to the side of the wall in the closed state of being contained in the liquid crystal television in hanging on the wall. Thereby, different from a case of bringing the wall and the back face of the liquid crystal television into close contact with each other without a gap therebetween, heat can excellently be radiated from the heat radiating hole provided at the back face of the liquid crystal television to outside. As a result, also in hanging on the wall, the inner temperature of the liquid crystal television can effectively be restrained from rising. Further, when the angle of inclining the stand member to the side of the wall is reduced, a width of the heat radiating space can be reduced. Thereby, a distance between the wall and a display face of the liquid crystal television can be reduced and therefore, in hanging on the wall, a distance of projecting the liquid crystal television from the wall can be reduced. Further, by providing the projected piece for restricting the pivoting member to the position of being inclined by the predetermined angle to the side of the wall in the closed state in hanging on the wall, by the projected piece, the pivoting member can be inclined by the predetermined angle to the side of the wall easily in the closed state in hanging on the wall. Further, by integrally providing the projected piece to the base member and providing a pair of left and right thereof, the projected piece can be provided without increasing a number of parts and by the pair of projected pieces, in comparison with a case of the single projected piece, a position of an inclined angle in the closed state of the pivoting member can solidly be maintained.

According to a second aspect of the invention, there is provided a liquid crystal display apparatus including a stand member including a base member attached to be contained in a recess portion of a back face of a cabinet constituting an apparatus main body and a pivoting member pivotably attached to the base member, supporting the apparatus main body by bringing the pivoting member into an opened state by being pivoted by a predetermined angle in mounting and capable of containing the pivoting member in the back face of the cabinet in mounting on the wall, an engaging portion provided at the back face of the cabinet and engaged with a side of the wall in hanging on the wall, and a heat radiating hole provided at the back face of the cabinet for radiating heat of the apparatus main body to outside, wherein the pivoting member of the stand member is brought into contact with the wall at a front end side of the pivoting member to form a predetermined gap between the wall and the back face of the cabinet by being inclined by a predetermined angle to the side of the wall in a closed state of being contained in the back face of the cabinet in hanging on the wall.

According to the liquid crystal display apparatus according to the second aspect of the invention, as described above, a heat radiating space can be formed between the back face of the cabinet of the liquid crystal television 10 and the wall in hanging on the wall by bringing the front end side of the pivoting member into contact with the wall to form the predetermined gap between the wall and the back face of the cabinet by inclining the pivoting member of the stand member by the predetermined angle to the side of the wall in the closed state of being contained in the liquid crystal display apparatus in hanging on the wall. Thereby, different from a case of bringing the wall and the back face of the liquid crystal apparatus into close contact with each other without a gap therebetween, heat can excellently be radiated from the heat radiating hole provided at the back face of the liquid crystal display apparatus to outside. As a result, also in hanging on the wall, an inner temperature of the liquid crystal display apparatus can effectively be restrained from rising. Further, when an angle of inclining the stand member to the side of the wall is reduced, a width of the heat radiating space can be reduced. Thereby, a distance between the wall and a display face of the liquid crystal display apparatus can be reduced and therefore, in hanging on the wall, a distance of projecting the liquid crystal display apparatus from the wall can be reduced.

According to the liquid crystal display apparatus according to the second aspect, preferably, the base member of the stand member is provided with a projected piece for restricting the pivoting member to a position of being inclined by the predetermined angle to the side of the wall in the closed state in hanging on the wall. When constituted in this way, by the projected piece, the pivoting member can be inclined by the predetermined angle to the side of the wall 30 easily in the closed state in hanging on the wall.

In the liquid crystal display apparatus provided with the projected piece at the base member of the stand member, preferably, the projected piece is integrally provided with the base member and a pair of left and right thereof are provided. When constituted in this way, the projected piece can be provided without increasing a number of parts, and by the pair of projected pieces, in comparison with a case of the single projected piece, a position of the inclined angle in the closed state of the pivoting member can further solidly be maintained.

In the liquid crystal display apparatus according to the second aspect, preferably, the front end side of the pivoting member of the stand member is provided with a contact portion made of rubber brought into contact with a wall face in hanging on the wall. When constituted in this way, in hanging on the wall, by bringing the contact portion made of rubber having an elasticity into contact with the wall in a face-like shape, the wall can be restrained from being damaged.

BRIEF DESCRIPTION OF THE DRAWINGS

These and other objects and advantages of this invention will become more fully apparent from the following detailed description taken with the accompanying drawings in which.

DETAILED DESCRIPTION OF THE PREFERRED EMBODIMENTS

The embodiment of the invention will be explained in reference to the drawings as follows. Further, in the following embodiment, en explanation will be given by taking an example of a liquid crystal television as an example of a liquid crystal display apparatus.

Figure 1:
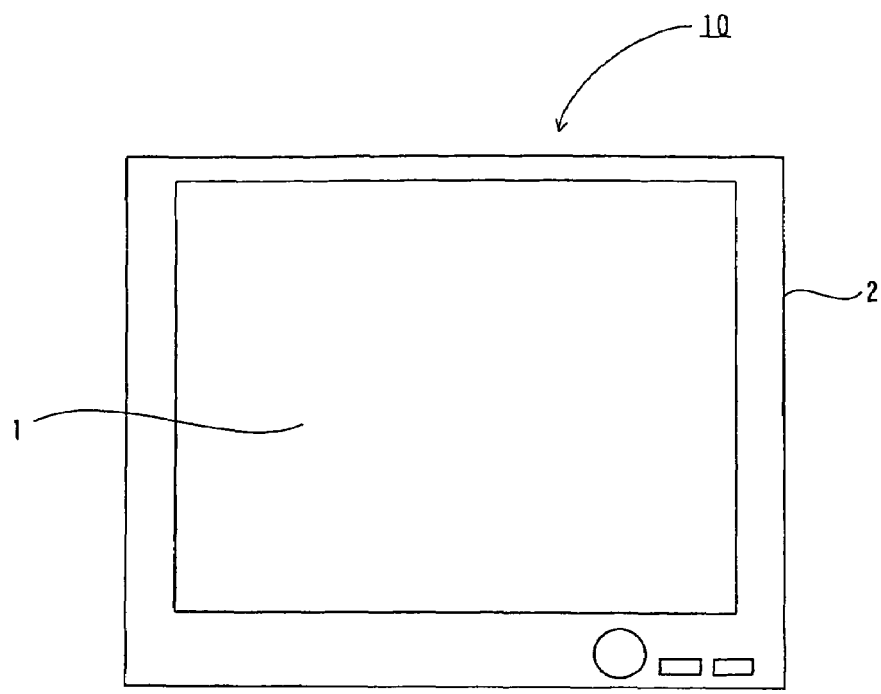
FIG. 1 is a front view showing a total constitution of a liquid crystal television according to an embodiment of the invention.
Figure 2:
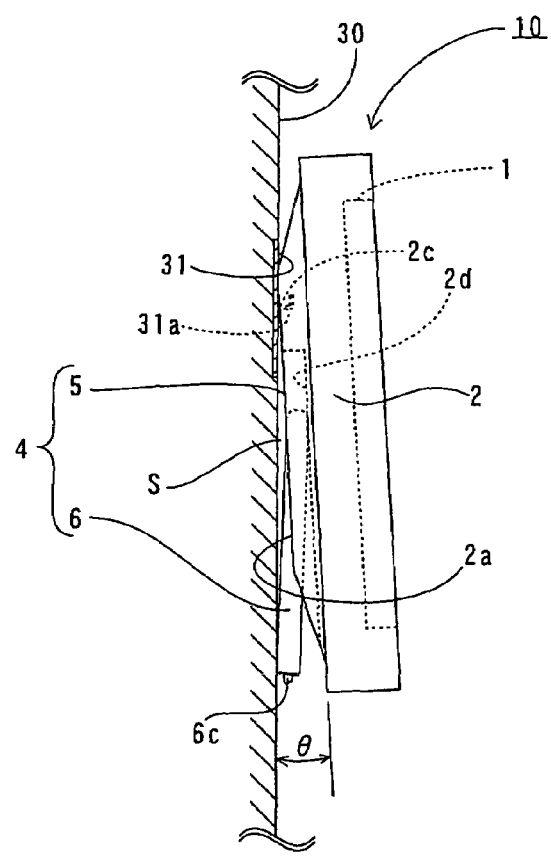
FIG. 2 is a side view showing a state of attaching the liquid crystal television according to the embodiment shown in FIG. 1 to an attaching plate of a wall.

FIG. 1 is a front view showing a total constitution of a liquid crystal television according to an embodiment of the invention. FIG. 2 is a side view showing a state of attaching the liquid crystal television according to the embodiment shown in FIG. 1 to an attaching plate of a wall. FIG. 3 through FIG. 9 are views for explaining details of a structure of the liquid crystal television according to the embodiment shown in FIG. 1. First, a structure of a liquid crystal television 10 according to the embodiment of the invention will be explained in reference to FIG. 1 through FIG. 9.

Figure 3:
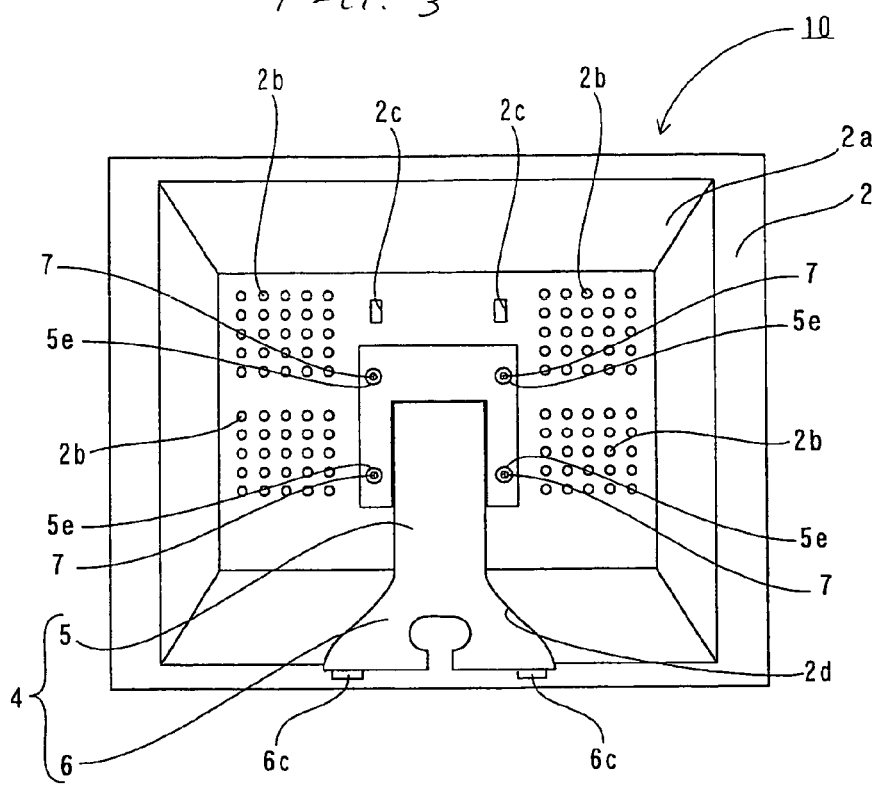
FIG. 3 is a rear view showing the liquid crystal television according to the embodiment shown in FIG. 1.

As shown by FIG. 1 through FIG. 3, the liquid crystal television 10 according to the embodiment of the invention is provided with a resin frame 2 arranged to surround a side face and a back face of a liquid crystal display unit 1. Further, a back face 2a of the resin frame 2 is provided with a plurality of heat radiating holes 2b and two engaging holes 2c. The heat radiating hole 2b is provided for radiating heat generated at the liquid crystal display unit 1 to outside. Further, as shown by FIG. 3, the engaging hole 2c is constituted to engage the liquid crystal television 10 to an engaging hook 31a of an attaching plate 31 attached to a wall 30 (refer to FIG. 2).

Further, the resin frame 2 is an example of a cabinet of the invention and the engaging hole 2c is an example of an engaging portion of the invention.

Figure 5:
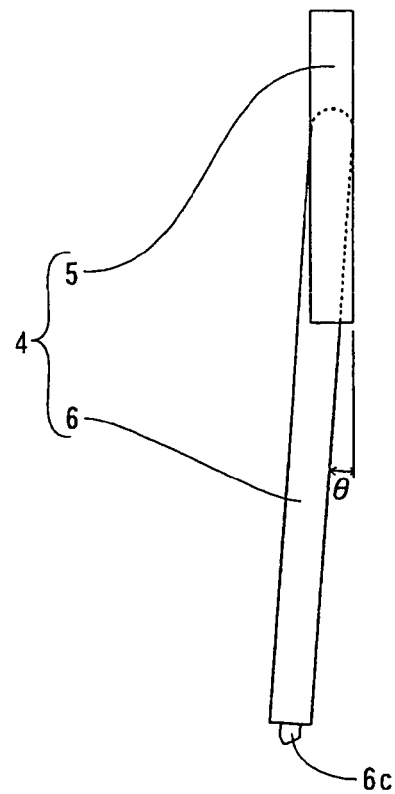
FIG. 5 is a side view showing the stand member of the liquid crystal television according to the embodiment shown in FIG. 1.

Further, the back face 2a of the resin frame 2 is attached with a stand member 4 and the back face 2a of the resin frame 2 is provided with a containing portion 2d for containing the stand member 4. As shown by FIG. 5, the stand member 4 is constituted by a base member 5 attached to the containing portion 2d of the back face 2a of the resin frame 2 and a pivoting member 6 made of resin pivotably attached to the base member 5.

Figure 4:
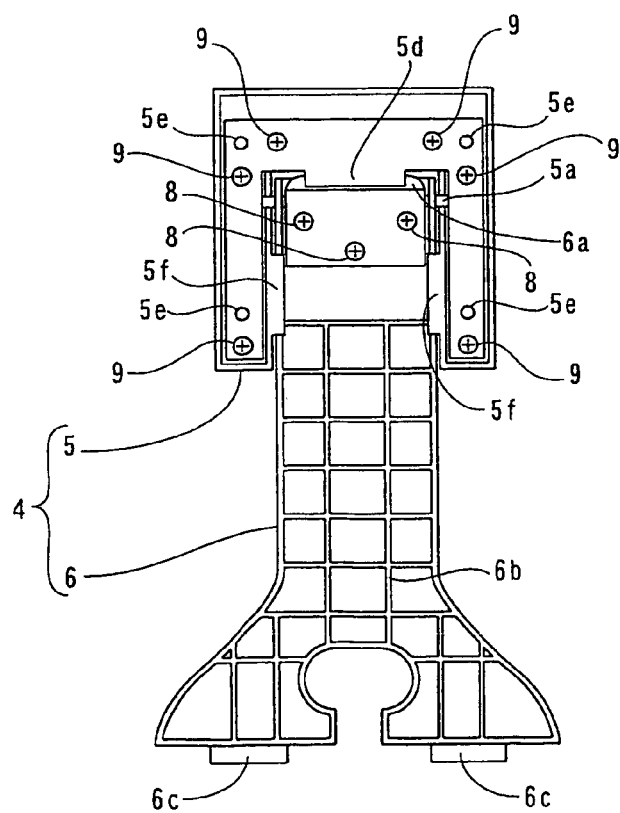
FIG. 4 is a rear view showing a stand member of the liquid crystal television according to the embodiment shown in FIG. 1.
Figure 7:
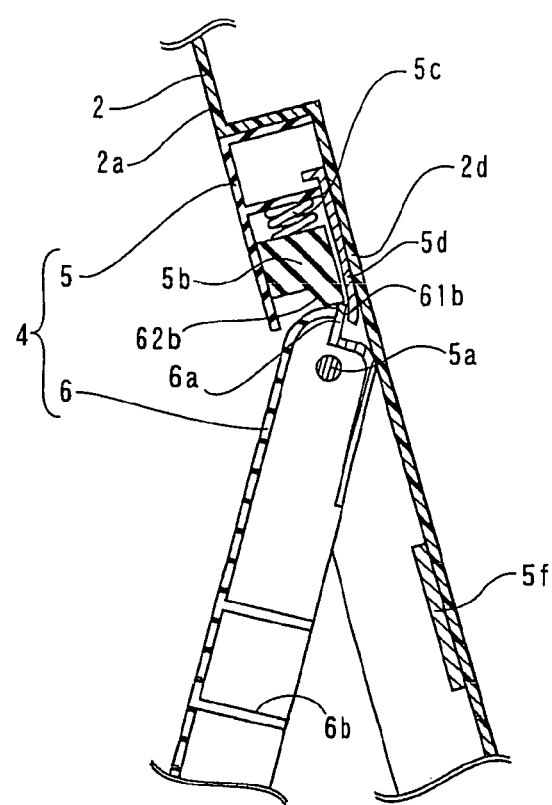
FIG. 7 is a sectional view in mounting the liquid crystal television according to the embodiment shown in FIG. 1.
Figure 9:
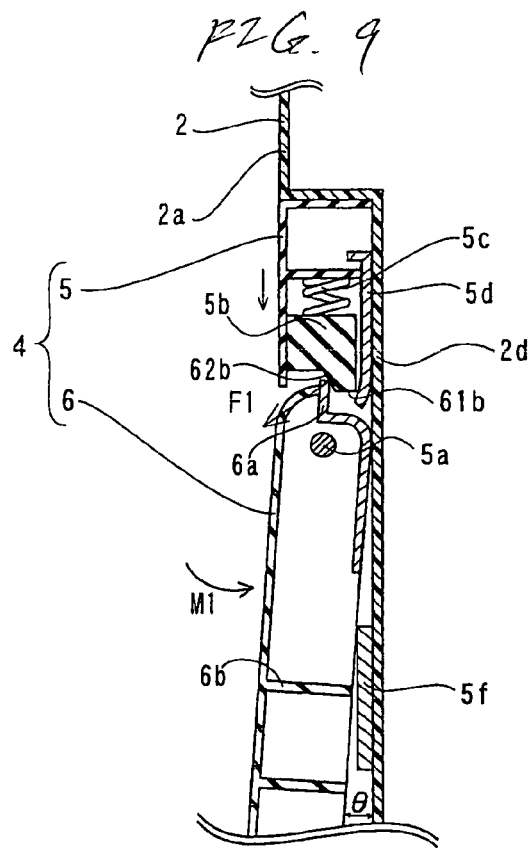
FIG. 9 is a sectional view in hanging the liquid crystal television according to the embodiment shown in FIG. 1 on the wall.

Further, as shown by FIG. 7 and FIG. 9, the pivoting member 6 of the stand member 4 is provided with a projected portion 6a made of a metal and a reinforcing rib 6b for reinforcing the pivoting member 6. Further, as shown by FIG. 4, the projected portion 6a is mounted to the pivoting member 6 by inserting and fastening three screws 8 to screw holes, not illustrated, of the projected portion 6a. Further, as shown by FIG. S, the pivoting member 6 of the stand member 4 is provided with a grounding portion 6c formed by rubber.

Here, according to the embodiment, as shown by FIG. 7 and FIG. 9, the base member 5 of the stand member 4 is provided with a pivoting shaft 5a, a pressing portion 5b, a pressing spring 5c, a positioning plate 5d made of a metal, four screw holes 5e (refer to FIG. 4), and a pair of left and right projected pieces 5f (refer to FIG. 4). Further, the pivoting member 6 is pivoted centering on the pivoting shaft 5a of the base member5. Further, the pressing portion 5b is arranged to be pressed by the pressing spring 5c to press the projected portion 6a of the pivoting member 6. Further, as shown by FIG. 3, by inserting and fastening four screws 7 into the screw holes 5e of the base member 5, the base member 5 of the stand member 4 is mounted to be embedded to the back face 2a of the resin frame 2. That is, the base member 5 of the stand member 4 is attached thereto so as not to be projected from a surface of the back face 2a of the resin frame 2. Further, as shown by FIG. 4, by inserting and fastening six screws 9 to screw holes, not illustrated, of the positioning plate 5d, the positioning plate 5d is mounted to the base member 5.

Next, an explanation will be given of a method of installing the liquid crystal television 10 according to the embodiment of the invention in reference to FIG. 2 and FIG. 6 through FIG. 9.

Figure 6:
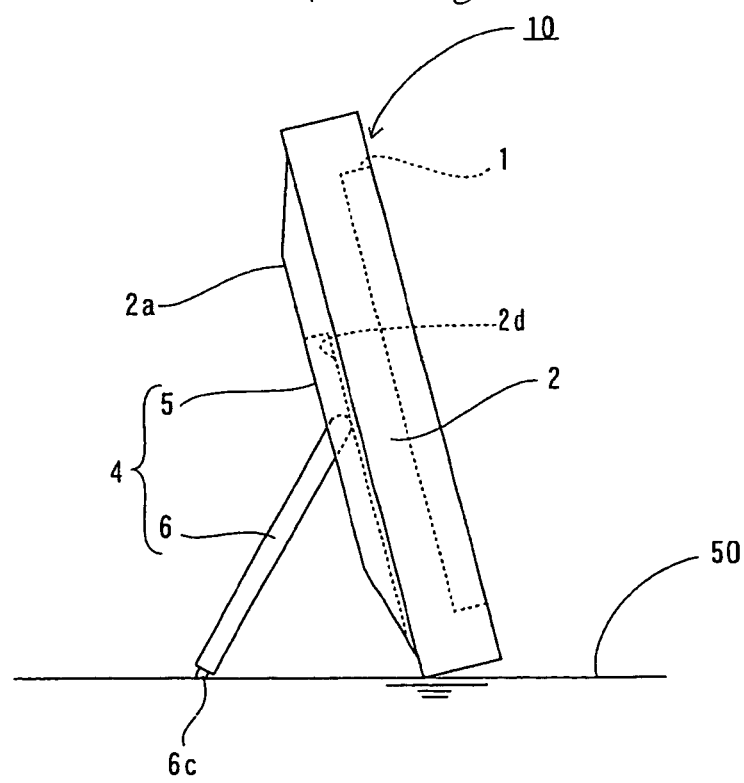
FIG. 6 is a side view in mounting the liquid crystal television according to the embodiment shown in FIG. 1.

First, as shown by FIG. 6, when the liquid crystal television 10 is mounted on a predetermined base 50, the pivoting member 6 of the stand member 4 supports the liquid crystal television 10 in an opened state of being pivoted by a predetermined angle amount relative to the back face 2a of the resin frame 2. Specifically, as shown by FIG. 7, the projected portion 6a of the pivoting member 6 is pressed to a pressed face 61b in mounting of the pressing portion 5b of the base member 5. Thereby, by bringing the projected portion 6a of the pivoting member 6 into contact with the positioning plate 5d of the base member 5, the pivoting member 6 is positioned to a position of an inclined angle in the opened state.

Figure 8:
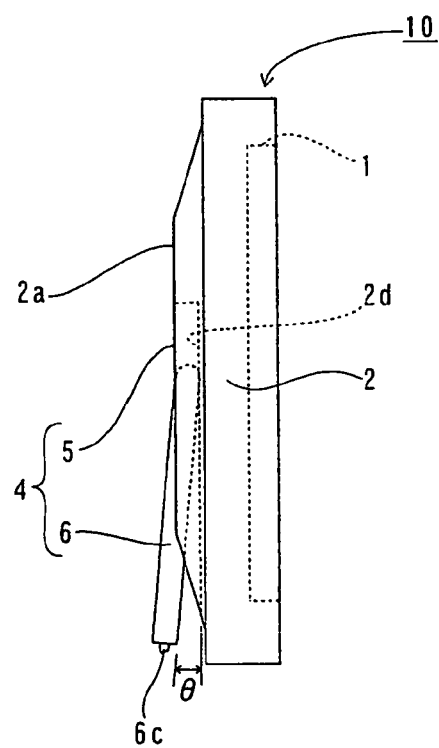
FIG. 8 is a side view in hanging the liquid crystal television according to the embodiment shown in FIG. 1 on a wall.

Here, according to the embodiment, in hanging on a wall, as shown by FIG. 8, the pivoting member 6 of the stand member 4 is brought into a closed state relative to the base member 5 and is contained in a state of being inclined by an angle θ (5° through 10°) relative to the containing portion 2d of the back face 2a of the resin frame 2. Specifically, as shown by FIG. 9, the projected portion 6a of the pivoting member 6 is pressed to a pressed face 62b in hanging on a wall of the pressing portion 5b of the base member 5. The pressed face 62b in hanging on a wall is inclined to a direction of pressing the base member 5 to generate a force. F1 for generating a moment M1 for pivoting the pivoting member 6 to a side of the containing portion 2d. Thereby, the pivoting member 6 is pressed to the side of the containing portion 2d to be brought into contact with the projected piece 5f. As a result, as shown by FIG. 2, by inclining the stand member 4 by the angle θ (5° through 10°) to a side of the wall 30 in a state of being contained in the containing portion 2d of the liquid crystal television 10, a front end side of the pivoting member 6 of the stand member 4 is brought into contact with the wall 30.

Further, according to the embodiment, in hanging on the wall, as shown by FIG. 2, the attaching plate 31 having the engaging hook 31a is attached to the wall 30. Further, by engaging the two engaging holes 2c (refer to FIG. 3) of the back face 2a of the resin frame 2 to the two engaging hooks 31a of the attaching plate 31, the liquid crystal television 10 is attached to the side of the wall 30. At this occasion, an upper side of the back face 2a of the resin frame 2 and the front end side of the pivoting member 6 of the stand member 4 are brought into contact with the wall 30, and a heat radiating space S is formed between the back face 2a of the liquid crystal television 10 and the wall 30.

According to the embodiment, the heat radiating space S can be formed between the back face 2a of the resin frame 2 of the liquid crystal television 10 and the wall 30 in hanging on the wall by bringing the front end side of the pivoting member 6 into contact with the wall 30 to form the predetermined gap (heat radiating space) S between the wall 30 and the back face 2a of the resin frame 2 by inclining the pivoting member 6 of the stand member 4 by the angle θ (50 through 10°) to the side of the wall 30 in the closed state of being contained in the liquid crystal television 10 in hanging on the wall. Thereby, different from a case of bringing the wall 30 and the back face 2a of the liquid crystal television 10 into close contact with each other without a gap therebetween, heat can excellently be radiated from the heat radiating hole 2b provided at the back face 2a of the liquid crystal television 10 to outside. As a result, also in hanging on the wall, the inner temperature of the liquid crystal television 10 can effectively be restrained from rising. Further, by making the angle θ of inclining the stand member 4 to the side of the wall 30 as small as 5° through 10°, a width of the heat radiating space S can be reduced. Thereby, a distance between the wall 30 and a display face of the liquid crystal television 10 can be reduced and therefore, in hanging on the wall, a distance of projecting the liquid crystal television 10 from the wall 30 can be reduced.

Further, according to the embodiment, by providing the projected piece 5f for restricting the pivoting member 6 to a position of being inclined by the angle θ (5° through 10°) to the side of the wall 30 in the closed state in hanging on the wall to the base member 5 of the stand member 4, by the projected piece 5f, the pivoting member 6 can be inclined by an amount of the angle θ (5° through 10°) to the side of the wall 30 easily in the closed state in hanging on the wall.

Further, according to the embodiment, by providing the projected piece 5f integrally to the base member 5 and providing a pair of left and right thereof, the projected piece 5f can be provided without increasing a number of parts and by the pair of projected pieces 5f, in comparison with the case of the single projected piece 5f, the position of the inclined angle in the closed state of the pivoting member 6 can further solidly be maintained.

Further, the embodiment disclosed this time is an exemplification in all the aspects and is to be regarded not to be restrictive. The range of the invention is indicated not by the explanation of the above-described embodiment but by the scope of claims and includes all the changes within the significance and the range of equivalency with the scope of claims.

For example, although according to the above-described embodiment, the liquid crystal television is shown as an example of the liquid crystal display apparatus, the invention is not limited thereto but is applicable also to other liquid crystal display apparatus other than the liquid crystal television so far as the apparatus is the liquid crystal display apparatus having the heat radiating hole and the stand member.

Figure 10:
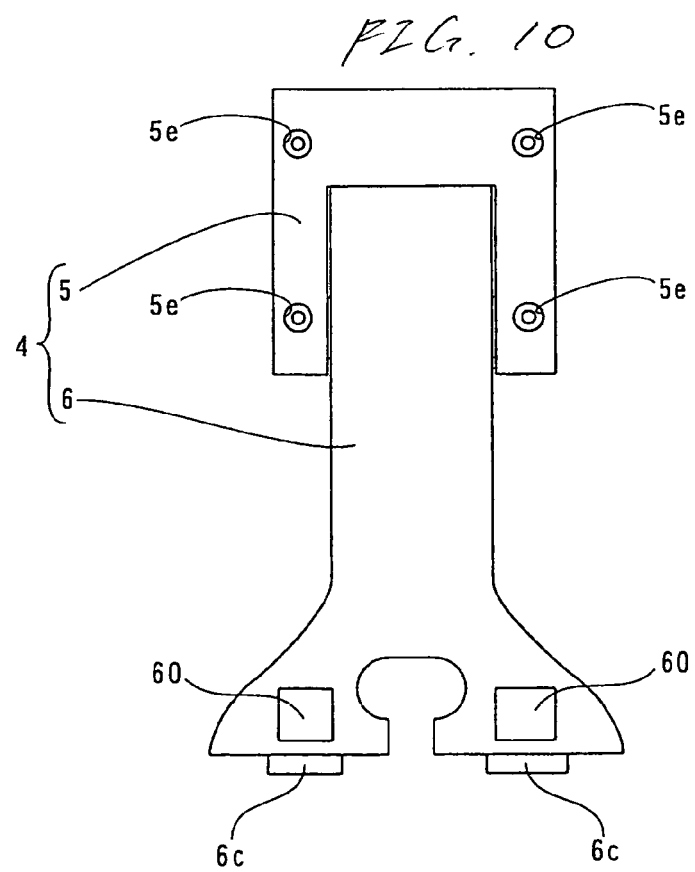
FIG. 10 is a front view showing a stand member of a liquid crystal television according to a modified embodiment of the embodiment shown in FIG. 1.
Figure 11:
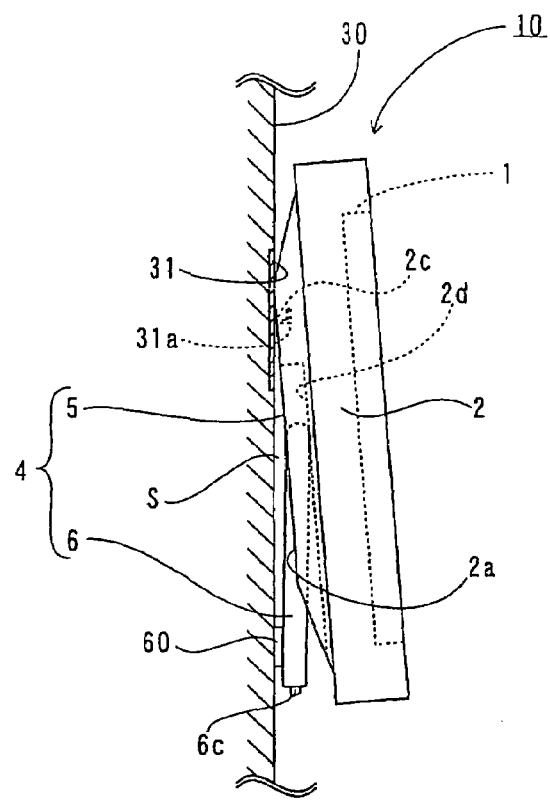
FIG. 11 is a side view showing a state of attaching the liquid crystal television according to the modified embodiment of the embodiment shown in FIG. 1 to an attaching plate of a wall.
Figure 12:
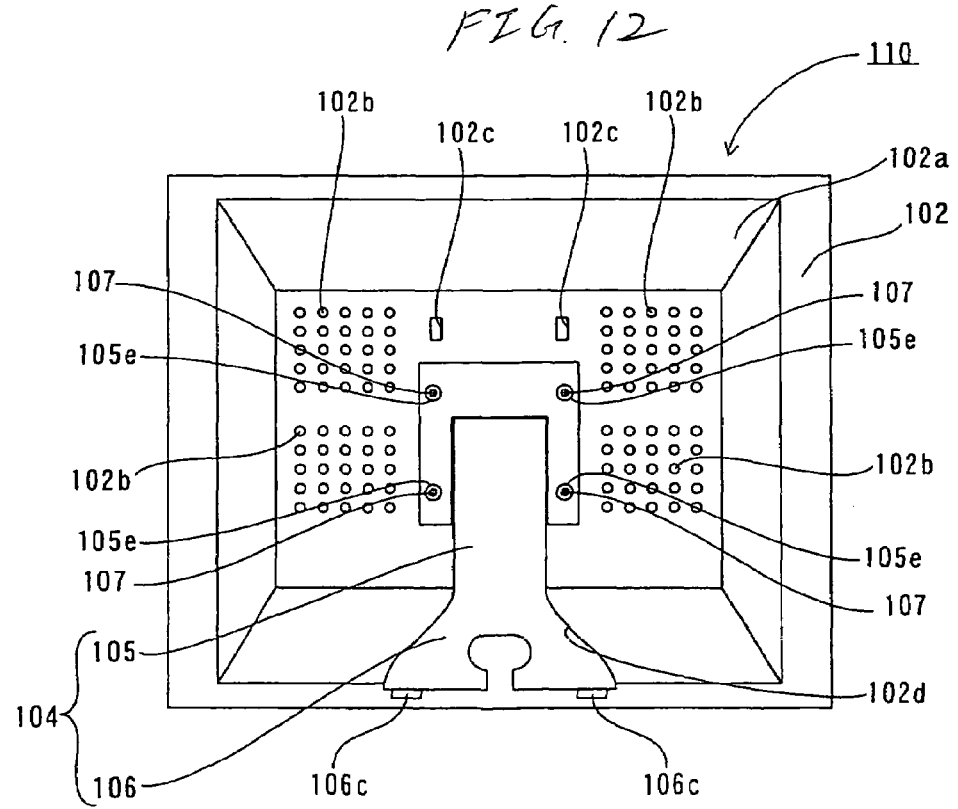
FIG. 12 is a rear view showing a total constitution of a liquid crystal television according to an example of a background art.
Figure 13:
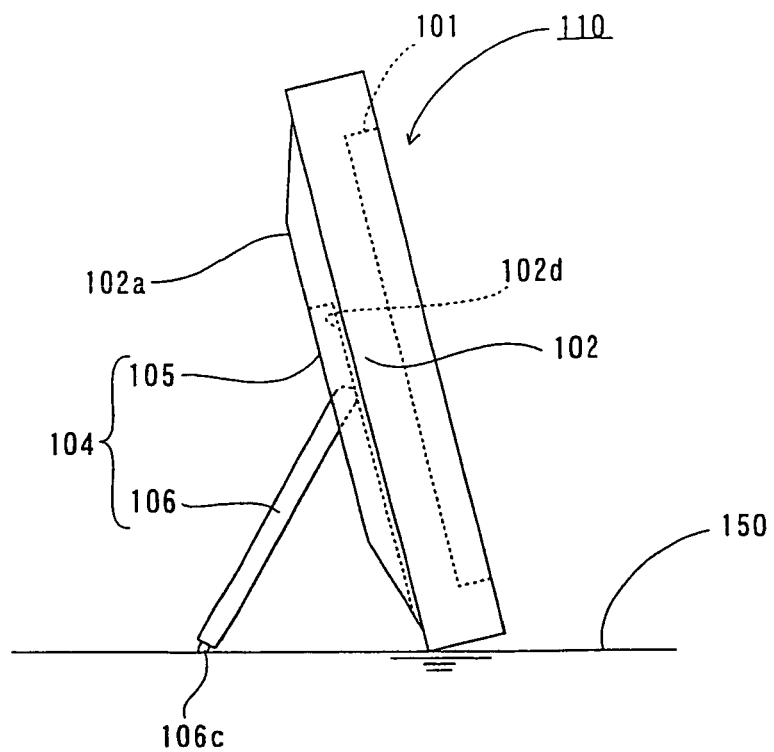
FIG. 13 is a side view in mounting the liquid crystal television according to the example of the background art shown in FIG. 12.
Figure 14:
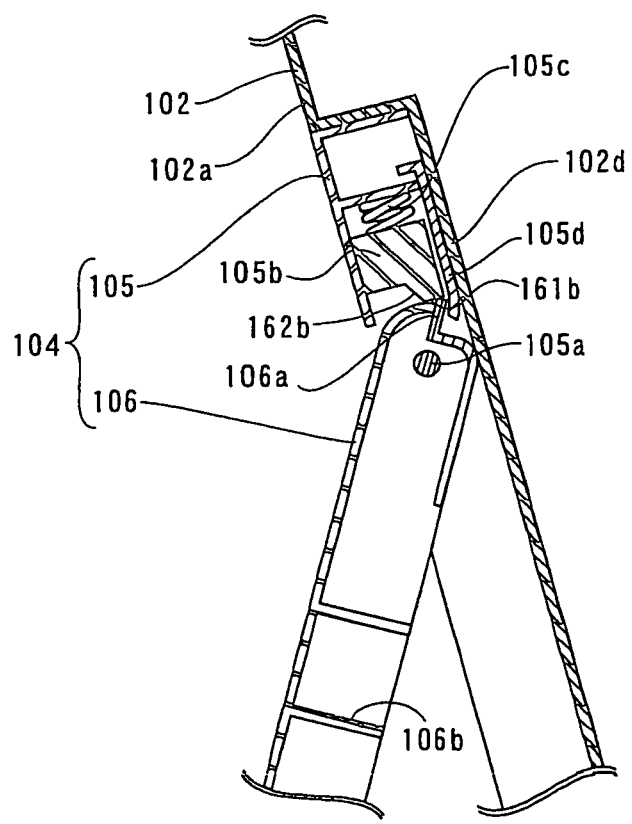
FIG. 14 is a sectional view in mounting the liquid crystal television according to the example of the background art shown in FIG. 12.
Figure 15:
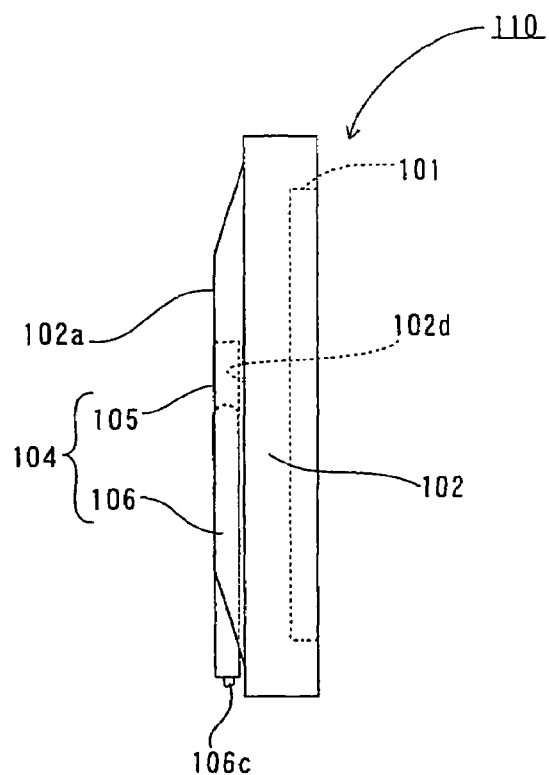
FIG. 15 is a side view in hanging the liquid crystal television according to the example of the background art shown in FIG. 12 on a wall.
Figure 16:
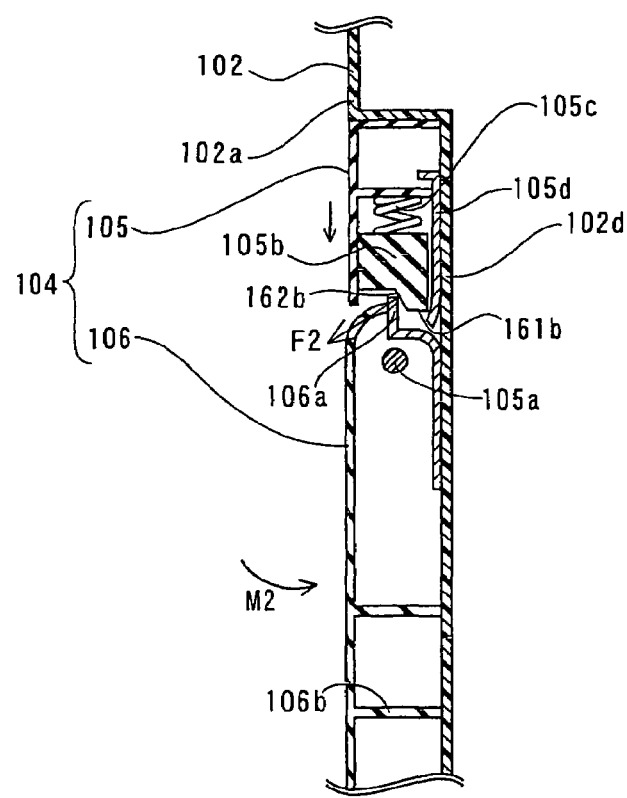
FIG. 16 is a sectional view in hanging the liquid crystal television according to the example of the background art shown in FIG. 12 on the wall.
Figure 17:
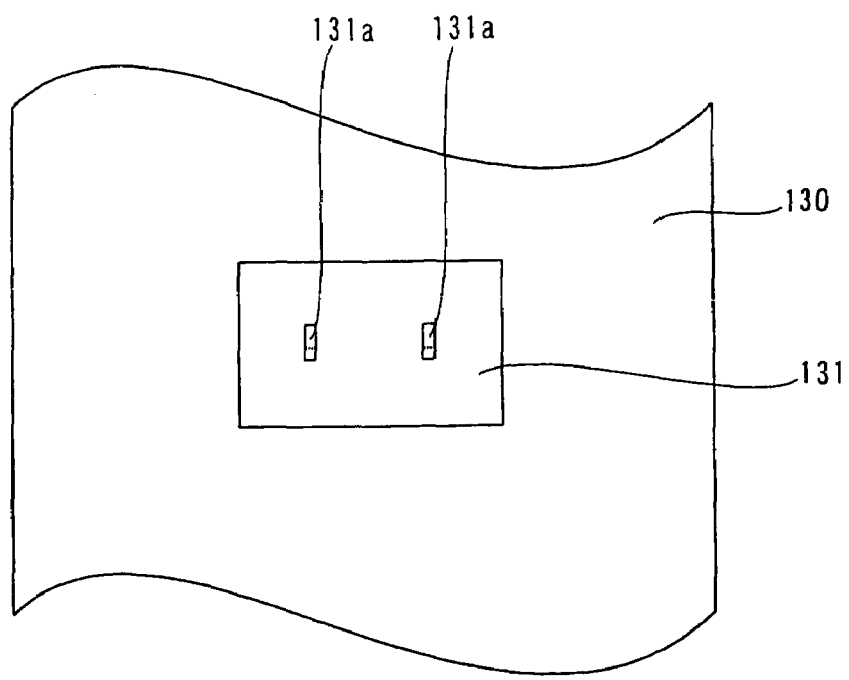
FIG. 17 is a front view of the wall to which the liquid crystal television according to the example of the background art shown in FIG. 12 is attached in hanging on the wall.
Figure 18:
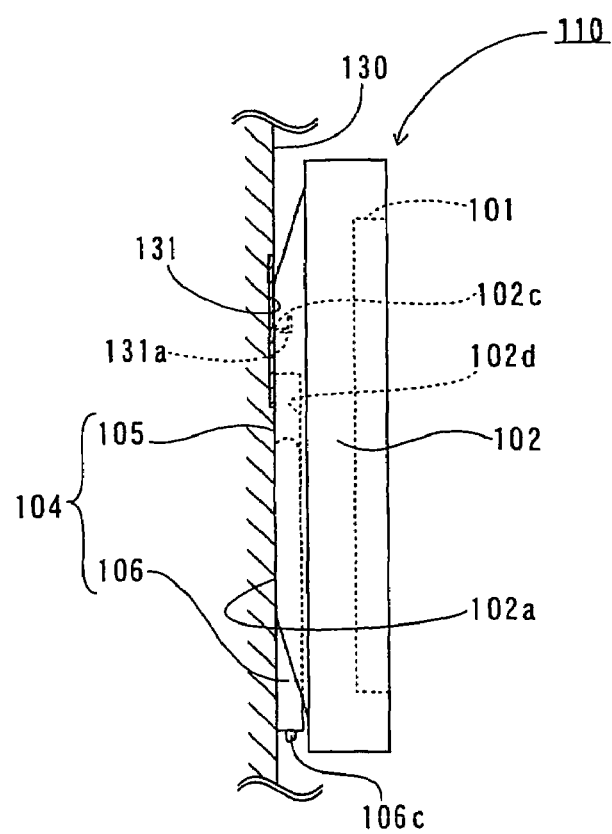
FIG. 18 is a side view showing a state of attaching the liquid crystal television according to the example of the background art shown in FIG. 12 to an attaching plate of the wall.

Further, although according to the embodiment, an example of bringing the front end side of the pivoting member 6 of the stand member 4 into contact with the wall 30 is shown, the invention is not limited thereto but as in a modified example shown in FIG. 10 and FIG. 11, a contact portion 60 may be provided on the front end side of the pivoting member 6 of the stand member 4 and the contact portion 60 may be brought into contact with the wall 30. In this case, the pivoting member 6 of the stand member 4 can be brought into contact with the wall 30 in a face-like shape and therefore, different from a case of bringing the pivoting member 6 into contact with the wall 30 in a linear shape, the wall 30 can be restrained from being damaged. Particularly, when the contact portion 60 is formed by rubber, the contact portion 60 made of rubber having an elasticity can be brought into contact with the wall 30 and therefore, the wall 30 can further be restrained from being damaged. Further, the contact portion 60 may be formed by resin and may integrally be formed with the pivoting member 6 made of resin. In this case, the contact portion 60 can be provided without increasing a number of parts.

What is claimed is:

1. A liquid crystal television comprising:
    a cabinet constituting an apparatus main body;
    a stand member including:
        a base member attached to be contained in a recess portion of a back face of the cabinet; and
        a pivoting member pivotably attached to the base member;
    an engaging portion provided at the back face of the cabinet for engaging with a side of a wall in hanging on the wall; and
    a heat radiating hole provided at the back face of the cabinet for radiating heat of the apparatus main body to outside, wherein:
    the stand member supports the apparatus main body by bringing the pivoting member into an opened state by being pivoted by a predetermined angle in mounting, and contains the pivoting member in the back face of the cabinet in hanging on the wall;
    the pivoting member of the stand member is brought into contact with the wall at a front end side of the pivoting member to form a predetermined gap between the wall and the back face of the cabinet by being inclined by a predetermined angle to a side of the wall in a closed state of being contained in the back face of the cabinet in hanging on the wall; and
    the base member of the stand member is integrally provided with a pair of left and right projected pieces for restricting the pivoting member to a position of being inclined by the predetermined angle to the side of the wall in hanging on the wall.

2. A liquid crystal display apparatus comprising:
    a cabinet constituting an apparatus main body;
    a stand member including:
        a base member attached to be contained in a recess portion of a back face of the cabinet; and
        a pivoting member pivotably attached to the base member;
    an engaging portion provided at the back face of the cabinet and engaged with a side of a wall in hanging on the wall; and
    a heat radiating hole provided at the back face of the cabinet for radiating heat of the apparatus main body to outside, wherein:
    the stand member supports the apparatus main body by bringing the pivoting member into an opened state by being pivoted by a predetermined angle in mounting, and contains the pivoting member in the back face of the cabinet in mounting on the wall;
    the pivoting member of the stand member is brought into contact with the wall at a front end side of the pivoting member to form a predetermined gap between the wall and the back face of the cabinet by being inclined by a predetermined angle to the side of the wall in a closed state of being contained in the back face of the cabinet in hanging on the wall.

3. The liquid crystal display apparatus according to claim 2, wherein
    the base member of the stand member is provided with a projected piece for restricting the pivoting member to a position of being inclined by the predetermined angle to the side of the wall in the closed state in hanging on the wall.

4. The liquid crystal display apparatus according to claim 3, wherein
    the projected piece is integrally provided with the base member and a pair of left and right thereof are provided.

5. The liquid crystal display apparatus according to claim 2, wherein
    the front end side of the pivoting member of the stand member is provided with a contact portion made of rubber brought into contact with a wall face in hanging on the wall.

* * * * *